(12) United States Patent
Fratini et al.

(10) Patent No.: US 11,754,199 B2
(45) Date of Patent: Sep. 12, 2023

(54) VALVE ASSEMBLY WITH CAP

(71) Applicant: Crane ChemPharma & Energy Corp., The Woodlands, TX (US)

(72) Inventors: Alejandro Fratini, Long Beach, CA (US); Samson Kay, Cincinnati, OH (US); Ranjit Bhalkar, Pune (IN); Anubhav Sinha, Pune (IN); Vivek Katkar, Pune (IN)

(73) Assignee: Crane ChemPharma & Energy Corp., The Woodlands, TX (US)

( * ) Notice: Subject to any disclaimer, the term of this patent is extended or adjusted under 35 U.S.C. 154(b) by 0 days.

(21) Appl. No.: 17/248,979

(22) Filed: Feb. 16, 2021

(65) Prior Publication Data

US 2021/0254751 A1    Aug. 19, 2021

Related U.S. Application Data

(60) Provisional application No. 62/976,566, filed on Feb. 14, 2020.

(51) Int. Cl.
*F16K 41/06* (2006.01)
*F16K 3/12* (2006.01)

(52) U.S. Cl.
CPC .............. *F16K 41/06* (2013.01); *F16K 3/12* (2013.01)

(58) Field of Classification Search
CPC .......... F16K 41/06; F16K 41/02; F16K 41/04; F16K 41/08; F16K 41/083; F16K 41/063; F16K 3/12; F16K 27/047; F16K 1/08; F16K 1/36; Y10T 137/7043; Y10T 137/7062; Y10T 137/7065

USPC ................................... 137/377, 382
See application file for complete search history.

(56) References Cited

U.S. PATENT DOCUMENTS

| | | | | |
|---|---|---|---|---|
| 685,396 A * | 10/1901 | Dexter | ................... | F16K 35/10 137/382 |
| 925,880 A * | 6/1909 | Doolittle | ................... | F16K 3/12 251/327 |
| 1,502,734 A * | 7/1924 | Martin | ................... | F16K 41/02 251/214 |
| 1,582,786 A * | 4/1926 | Rhodes | ................... | F16K 41/02 277/525 |
| 1,903,028 A * | 3/1933 | Carlson | ................... | F16K 41/02 277/511 |
| 1,995,395 A * | 3/1935 | Mohr | ................... | F16K 41/02 277/520 |
| 2,601,840 A * | 7/1952 | Smith | ................... | F16L 23/167 436/100 |
| 2,708,896 A * | 5/1955 | Smith | ................... | F16L 59/168 436/100 |
| 3,272,224 A * | 9/1966 | Wrenshall | ............... | F16K 27/04 137/382 |
| 3,284,089 A * | 11/1966 | Wrenshall | ................ | F16J 15/20 277/530 |

(Continued)

*Primary Examiner* — Craig J Price
*Assistant Examiner* — Andrew J Rost

(57) ABSTRACT

A valve assembly includes a body having spaced apart ports defining a flow passageway therebetween and a top surface. A valve is disposed in the flow passageway. A bonnet is coupled to the top surface of the body. A rising stem is supported by the bonnet and is operably coupled to the valve. A cap includes a bottom sealingly coupled to at least one of the body or the bonnet and an opening. The cap is disposed over the bonnet with the stem extending through the opening.

19 Claims, 11 Drawing Sheets

(56) References Cited

U.S. PATENT DOCUMENTS

| | | | | | |
|---|---|---|---|---|---|
| 3,463,446 | A | * | 8/1969 | Natho | F16K 31/60 251/84 |
| 4,265,457 | A | * | 5/1981 | Lambie | F16K 41/06 277/529 |
| 4,389,037 | A | * | 6/1983 | Anders | F16K 3/12 251/326 |
| 4,601,304 | A | * | 7/1986 | Schobl | F16K 41/02 251/222 |
| 5,201,532 | A | * | 4/1993 | Salesky | F16K 41/04 277/530 |
| 5,454,547 | A | * | 10/1995 | Brown | F16J 15/18 251/266 |
| 5,743,288 | A | * | 4/1998 | Mosman | F16K 43/008 251/327 |
| 6,983,759 | B2 | * | 1/2006 | Maichel | F16K 3/12 137/315.29 |
| 2010/0180962 | A1 | * | 7/2010 | Degutis | F16K 15/063 137/526 |
| 2012/0018221 | A1 | * | 1/2012 | Crane | E21B 10/62 175/57 |

\* cited by examiner

VALVE ASSEMBLY WITH CAP

CROSS-REFERENCE TO RELATED APPLICATION(S) AND CLAIM OF PRIORITY

This application claims priority under 35 U.S.C. § 119(e) to U.S. Provisional Patent Application No. 62/976,566, filed Feb. 14, 2020, the disclosure of which is incorporated herein by reference.

TECHNICAL FIELD

The present disclosure relates generally to a valve assembly, and in particular, to a valve assembly having a cap, and to the method for retrofitting a valve assembly to stop leakage through the packing of a "rising stem" valve after it has been installed in its application.

BACKGROUND

"Rising stem" valves typically include a valve body having a flow passageway and seating element that transitions transversely to open or close the flow passageway by using a thread shaft (or "stem"). The valve body may be configured as a wedge valve or as a globe valve. In some applications, these valves are used to control the flow of various hazardous chemical applications which include but are not limited to, hydrofluoric (HF) acid. After the valve has been opened and closed over the life of service, the packing area of the valve can experience degradation resulting in failure of the packing which will allow a leak path to form through the packing to the outside of the valve.

SUMMARY

The present invention is defined by the following claims, and nothing in this section should be considered to be a limitation on those claims.

According to certain embodiments, a valve assembly includes a body having spaced apart ports defining a flow passageway therebetween and a top surface. A valve is disposed in the flow passageway. A bonnet is coupled to the top surface of the body. A stem is supported by the bonnet, and a yoke coupled thereto, and is operably coupled to the valve. A cap includes a bottom sealingly coupled to at least one of the body or the bonnet, and a top with an opening. The cap is disposed over the bonnet and with the stem extending through the opening.

In some embodiments, a valve assembly includes a body having spaced apart ports defining a flow passageway therebetween and a top surface. A valve is disposed in the flow passageway and is movable in a transverse direction between an open position and a closed position relative to the flow passageway. A cap is sealingly coupled to the body and has an opening. A stem is rotatably supported by the cap and is threadably coupled to the valve. The stem is rotatable in first and second rotation directions, wherein the valve is moveable in the transverse direction between the closed and open position as the stem is rotated in the first direction, and wherein the valve is moveable in the transverse direction between the open and closed positions as the stem is rotated in the second direction. A mechanical seal is disposed between the stem and the cap at the opening.

In various embodiments, a method of using a valve assembly includes rotating an actuator relative to a cap in a first rotation direction, wherein the cap is sealingly coupled to a body, and wherein the body has spaced apart ports defining a flow passageway therebetween, rotating a stem coupled to the actuator in the first rotation direction, wherein the stem is rotatably sealed relative to the cap with a mechanical seal, threadably engaging a valve with the stem, and moving the valve from a closed position to an open position.

The various embodiments of the valve assembly, and methods of retrofitting the valve assembly, provide significant advantages over other valve assemblies and methods of manufacture and use. For example and without limitation, the disclosed valve assembly provide exceptional sealing of the valve and mitigate the risks of leaking, for example, by eliminating the packing between the stem and bonnet, or by providing redundant sealing systems between the cap and bonnet and/or body.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
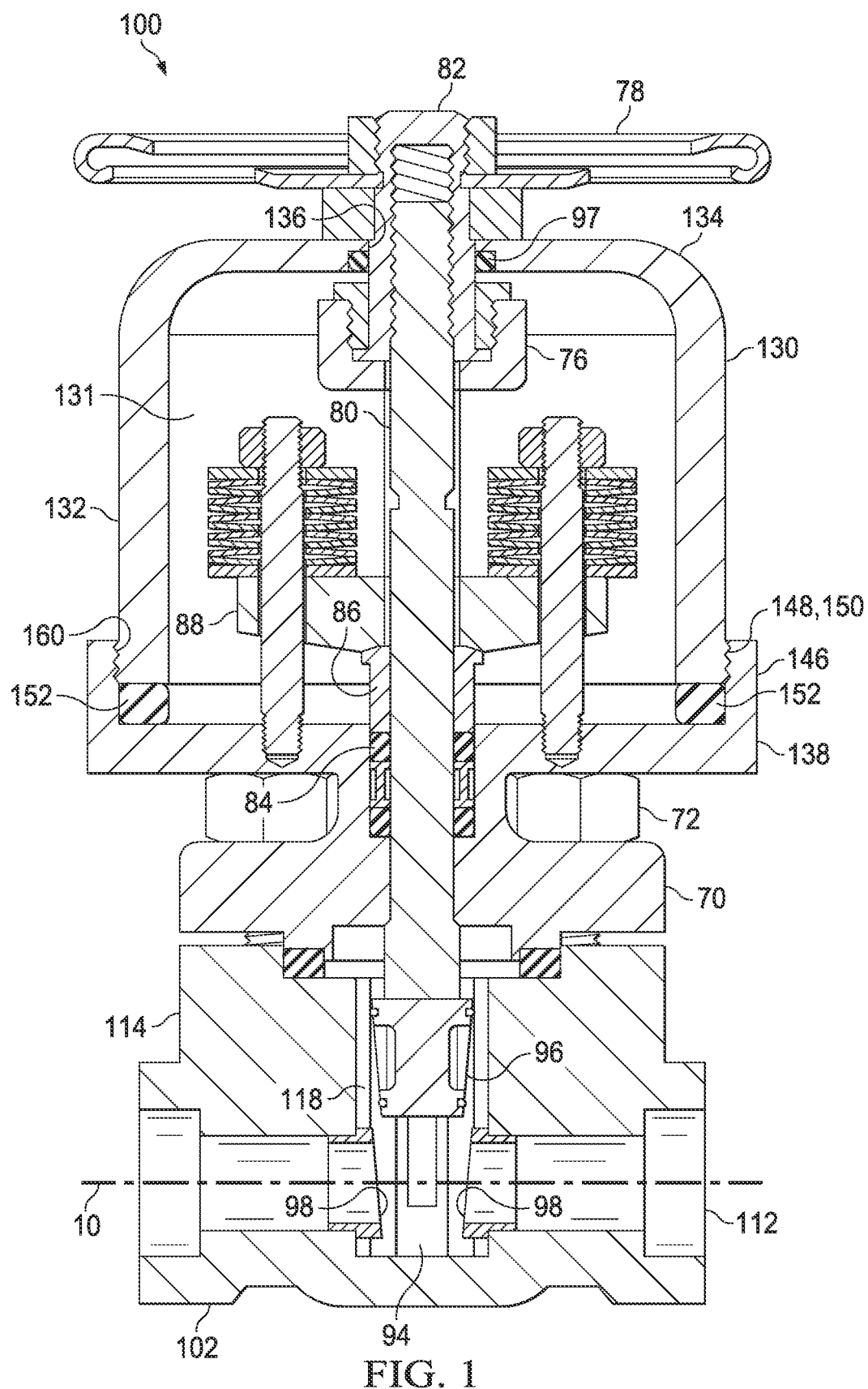
FIG. 1 illustrates a cross-sectional view of an example of a valve assembly according to various embodiments of this disclosure.
Figure 3:
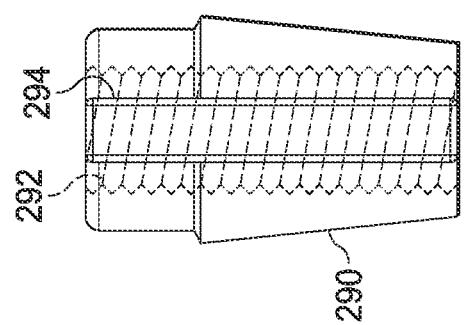
FIG. 3 illustrates an example of a wedge valve according to various embodiments.
Figure 2:
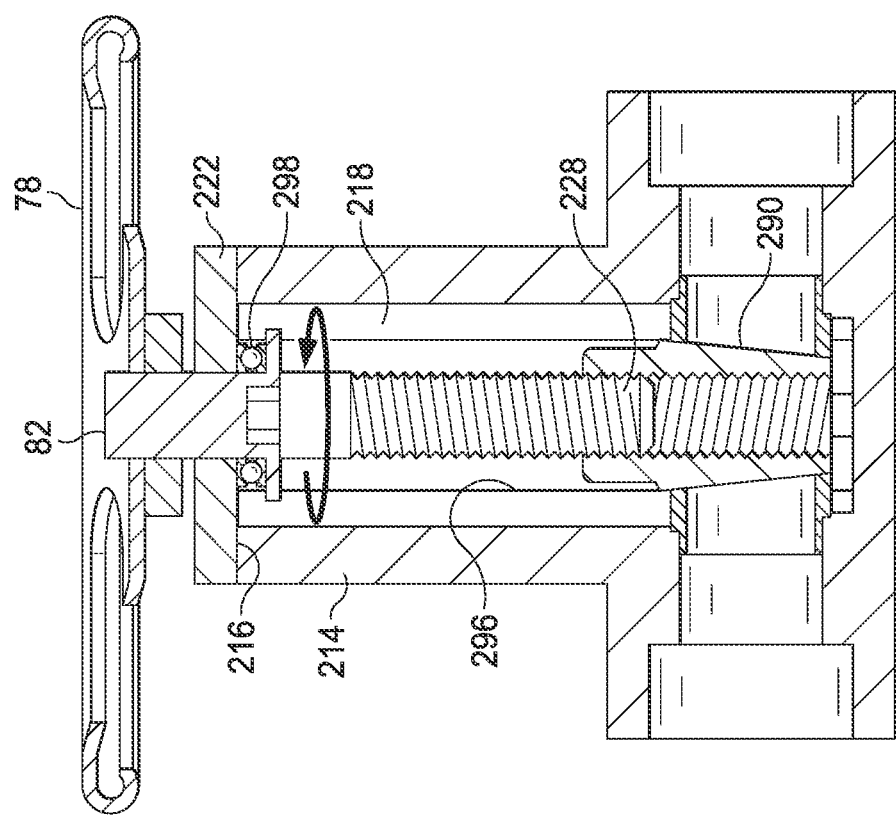
FIG. 2 illustrates, in a schematic cross-sectional view, an example of a valve assembly according to certain embodiments.

It should be understood that the term "plurality," as used herein, means two or more. The terms "outboard" and "inboard" refer to the relative position of different features relative to a common axis or plane. The term "coupled" means connected to or engaged with, whether directly or indirectly, for example with an intervening member, and does not require the engagement to be fixed or permanent, although it may be fixed or permanent (or integral). The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. For example, a "first" diameter may be later referred to as a "second" diameter depending on the order in which they are referred. It should also be understood that designation of "first" and "second" does not necessarily mean that the two components or values so designated are different, meaning for example a first diameter may be the same as a second diameter, with each simply being applicable to separate components. The terms "vertical" and "horizontal" refer to the orientation of various components as shown in the drawings, but with the understanding that those components may be rotated and used in other orientations.

Valve Body:

Referring to the illustrative examples of FIGS. 1-11C, a wedge gate valve 100, 200, 300 is shown as including a body 102, 202, 302 having a pair of cylindrical end portions 106, 206, 306 defining an interior flow passageway 112, 212, 312 that extends along a longitudinal axis 10 between opposite ends of the body. In certain embodiments, body 102, 202, 302 is a one-piece body. The end portions each have an interior flow passageway 112, 212, 312 which may be cylindrical or tapered with a varying diameter.

Figure 5:
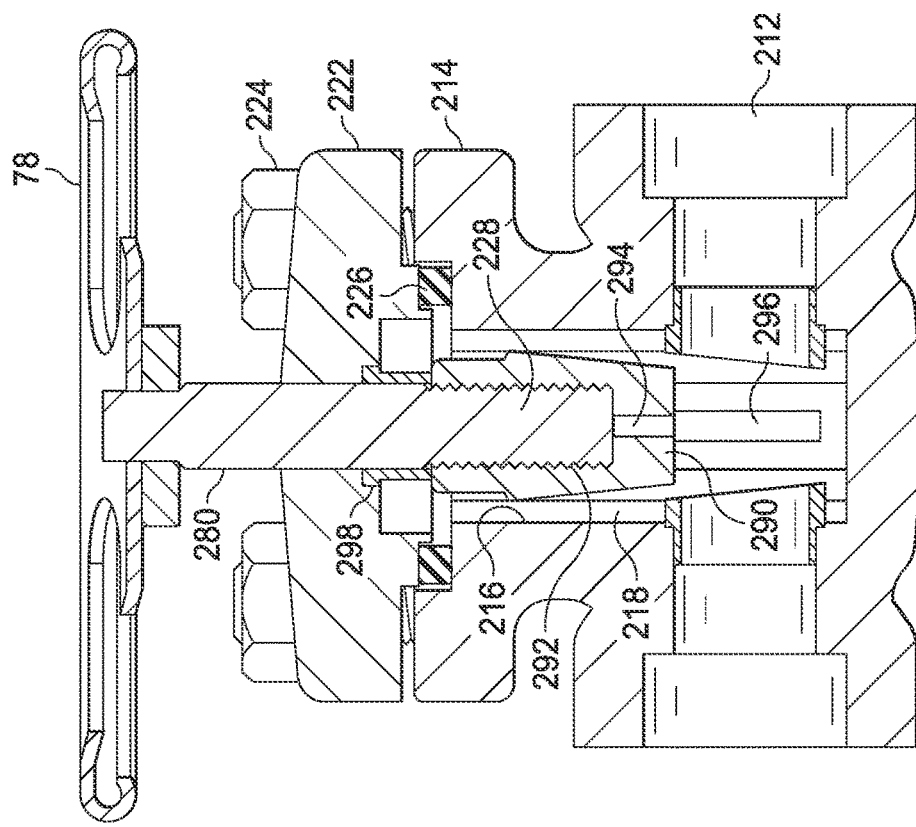
FIG. 5 is a cross-sectional view of the valve assembly shown in FIG. 4.
Figure 4:
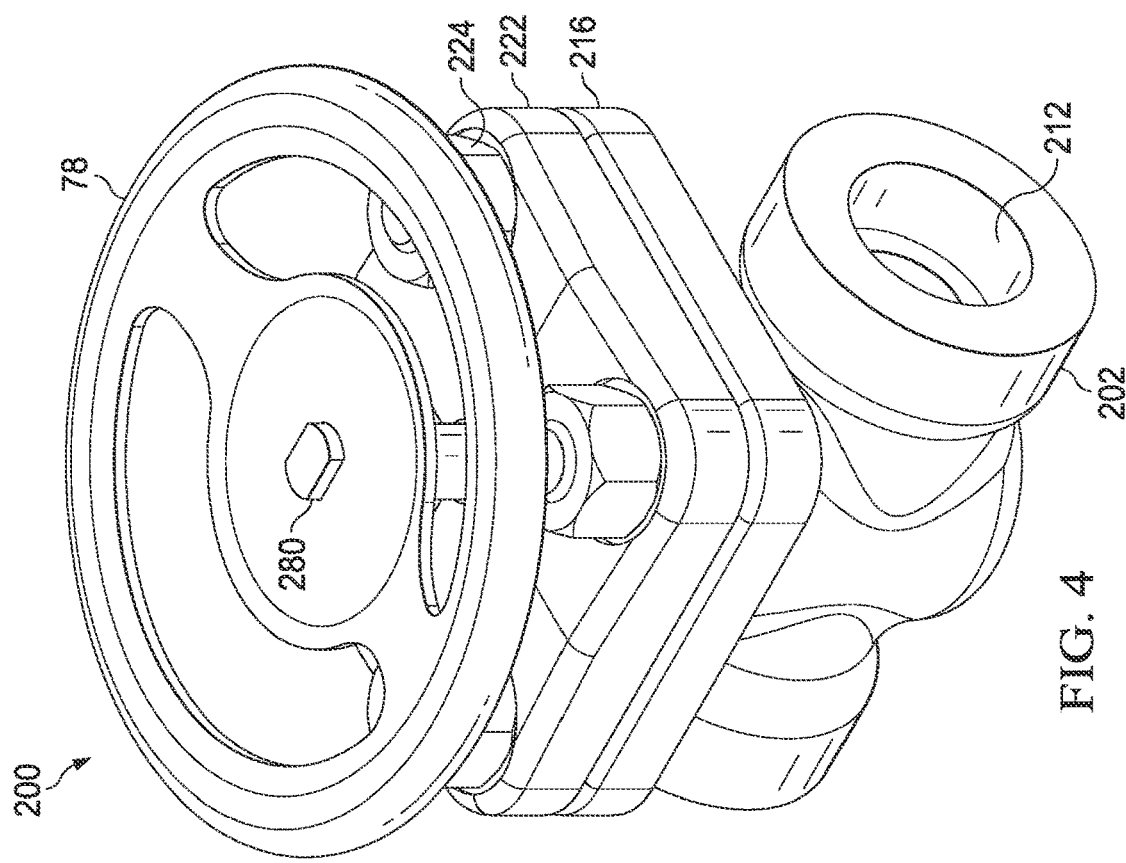
FIG. 4 is a perspective view of the valve assembly shown in FIG. 3.

A cylindrical neck portion 114, 214, 314 extends upwardly from the end portions. In certain embodiments, such as shown in FIG. 5, the neck portion includes an annular flange or top surface 216 defining a top of the body. The neck portion defines an interior chamber 118, 218, 310 having a circumferential side wall 120, 220, 320 and an open top.

Valve Components

Referring to FIGS. 1 and 6-11C, a bonnet 70 is secured to the top of the valve body with a plurality of fasteners 72, such as bolts, to close the open top of the interior chamber 118. A pressure seal or gasket 122 is disposed between a bottom surface 124 of the bonnet and an upper surface 126 of the valve body. A yoke 76 is coupled to and extends upwardly from the top of the bonnet and supports a valve stem 80. In one embodiment, the valve stem 80 is a rising stem, which is threadably engaged by an actuator 78, shown as a hand wheel including a stem nut 82, which is rotatably supported by the yoke, for example with a bearing or bushing. A valve stem packing 84 is disposed between the interface of the stem and the bonnet to prevent leakage therebetween. A gland 86 is disposed on the top of the packing 84, with a clamp 88 pressing on the gland and packing to maintain the seal.

A valve 90, configured as a wedge valve in certain embodiments, is coupled to a distal end of the stem with a carriage, which includes guides that slide along a track or grooves 94 in the chamber. In one embodiment, the wedge valve is configured as a dual disc gate valve. In other embodiments, the valve may be configured as a globe valve. The valve has opposite faces 96 that sealingly engage valve seats 98 on the valve body to close the flow passageway.

In operation, the stem 80 may be rotated by the actuator 78, causing the stem 80, valve 90 and carriage to move upwardly from the interior flow passageway 112, 212, 312 and into the interior chamber 118, 218, 318, whereinafter the valve is an open position such that the interior flow passageway 112, 212, 312 is not blocked by the valve. In one embodiment, the valve may be configured as a pair of discs, which may be parallel or arranged at an angle relative to each other in a wedge configuration. To close the interior flow passageway 112, 212, 312, the actuator 78 is rotated in the opposite direction, causing the valve to move downwardly into the interior flow passageway 112, 212, 312 and engage valve seats 98 disposed in the body.

Bonnet Cap and Operation

Referring to the examples of FIGS. 2-5, the valve assembly is configured with a non-rising stem 280. In this configuration, a bonnet cover plate 222, or cap, is secured to the top of the valve body with a plurality of bolts 224, with a seal or gasket 226 disposed therebetween. The stem 280 is rotatably supported by the cap, for example with a stem nut, but does not move vertically relative to the cap. Likewise, the actuator 78, or handwheel wheel, is non-rotatably fixed to the stem 280. Rather, a distal (lower) end 228 of the stem is threaded (male) and threadably engages a wedge valve 290 having a (female) threaded passageway 292, such that rotation of the stem causes the valve 290, which includes guide slots 294 (for example, tracks) or guides engaged with guides 296 or guide slots (e.g., tracks) on the valve body 202 to prevent rotation of the valve 290 relative to the valve body 202, to be raised or lowered between open and closed positions. A mechanical seal 298 is disposed between the stem 280 and the bonnet cap 222 to prevent leakage between the bonnet cap and stem, or stem nut. The mechanical seal 298 can, in certain embodiments, provide a more durable seal than the stem packing seal. The mechanical seal uses multiple sealing points to nearly eliminate any leakage issues. The mechanical seal allows rotation of the seal with the stem and seals against the bonnet cap. The internal diameter of the mechanical seal expands and compresses against the outside diameter of the stem to form a perfect seal. The seal also wicks away flow media from the stem at the seal/stem interface to prevent flow media from escaping to outside of the valve.

In operation, a method of using the valve assembly includes rotating the actuator 78 relative to the cap 222 in a first rotation direction, wherein the cap 222 is sealingly coupled to the valve body 202, rotating the stem 280 coupled to the actuator in the first rotation direction, wherein the stem is rotatably sealed relative to the cap 222 with a mechanical seal 298. The method further includes threadably engaging a valve with the stem 280, while preventing rotation of the valve 290 relative to the valve body through the interface of the guides 294/296, and moving the valve along the axis of the stem from a closed position to an open position.

Referring to the illustrative examples shown in FIGS. 1 and 9-11, a rising stem valve may be constructed with a cap 130 that seals with the bonnet 70 to provide additional leakage protection. The cap may be installed in a retrofit application on existing valves in the field, for example where the packing 84 may be susceptible to, or showing signs of, leakage, or as part of a new assembly. The cap 130 includes a bottom 132 sealingly coupled to the bonnet 70 and a top 134 with an opening 136, wherein the cap is disposed over the bonnet 70 with the stem 80 extending through the opening 136. The cap defines an interior chamber 131 in which the yoke is disposed, and which communicates with the interface between the stem and bonnet packing, or gland. The stem nut 82 may be mechanically sealed with the cap at the opening using a mechanical seal. The bonnet 70 includes an upper annular flange 138, wherein the bottom of the cap is sealingly coupled to the annular flange 138.

Figure 9:
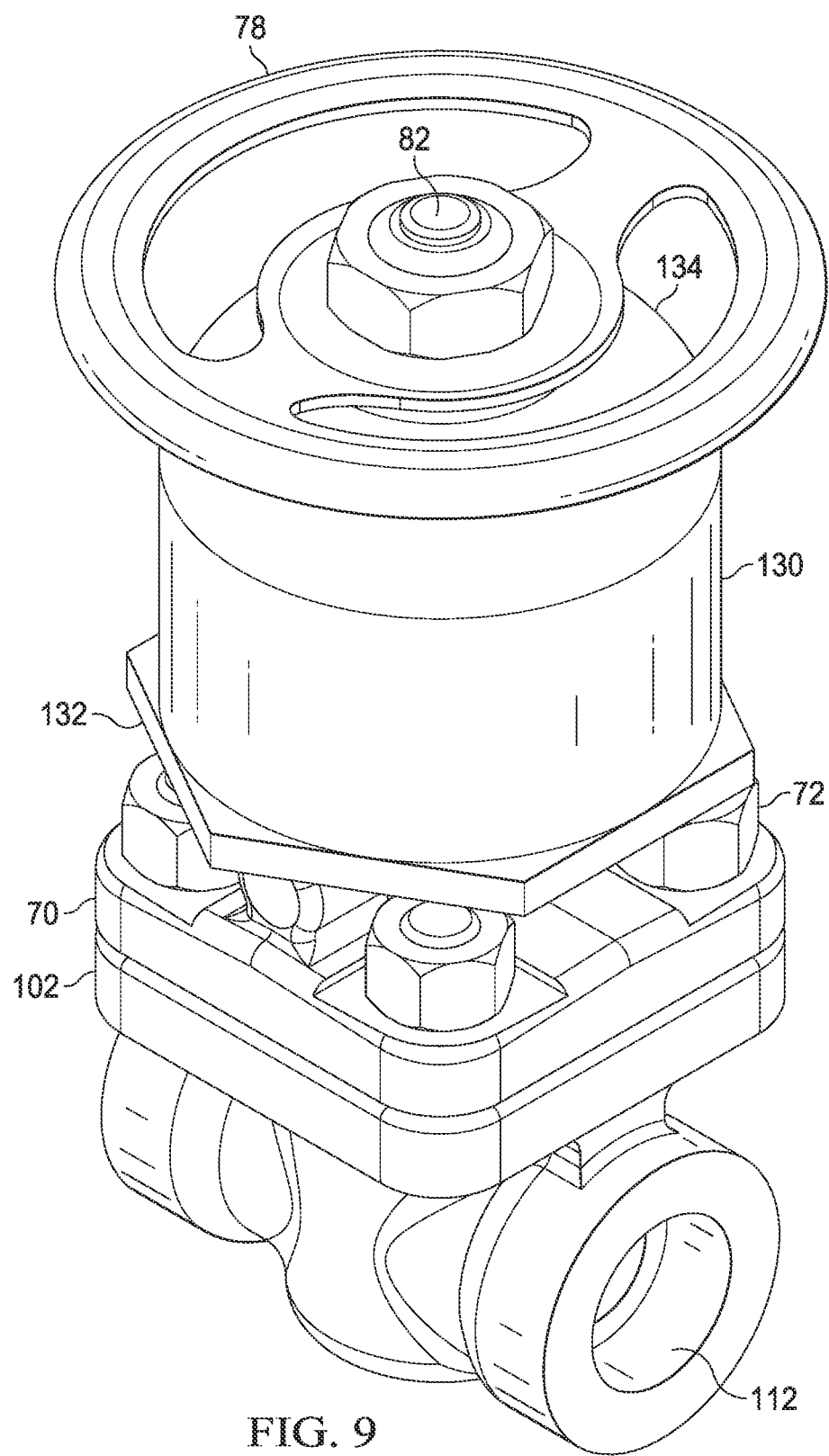
FIG. 9 illustrates in perspective view, an example of a valve assembly according to certain embodiments of this disclosure.
Figure 10:
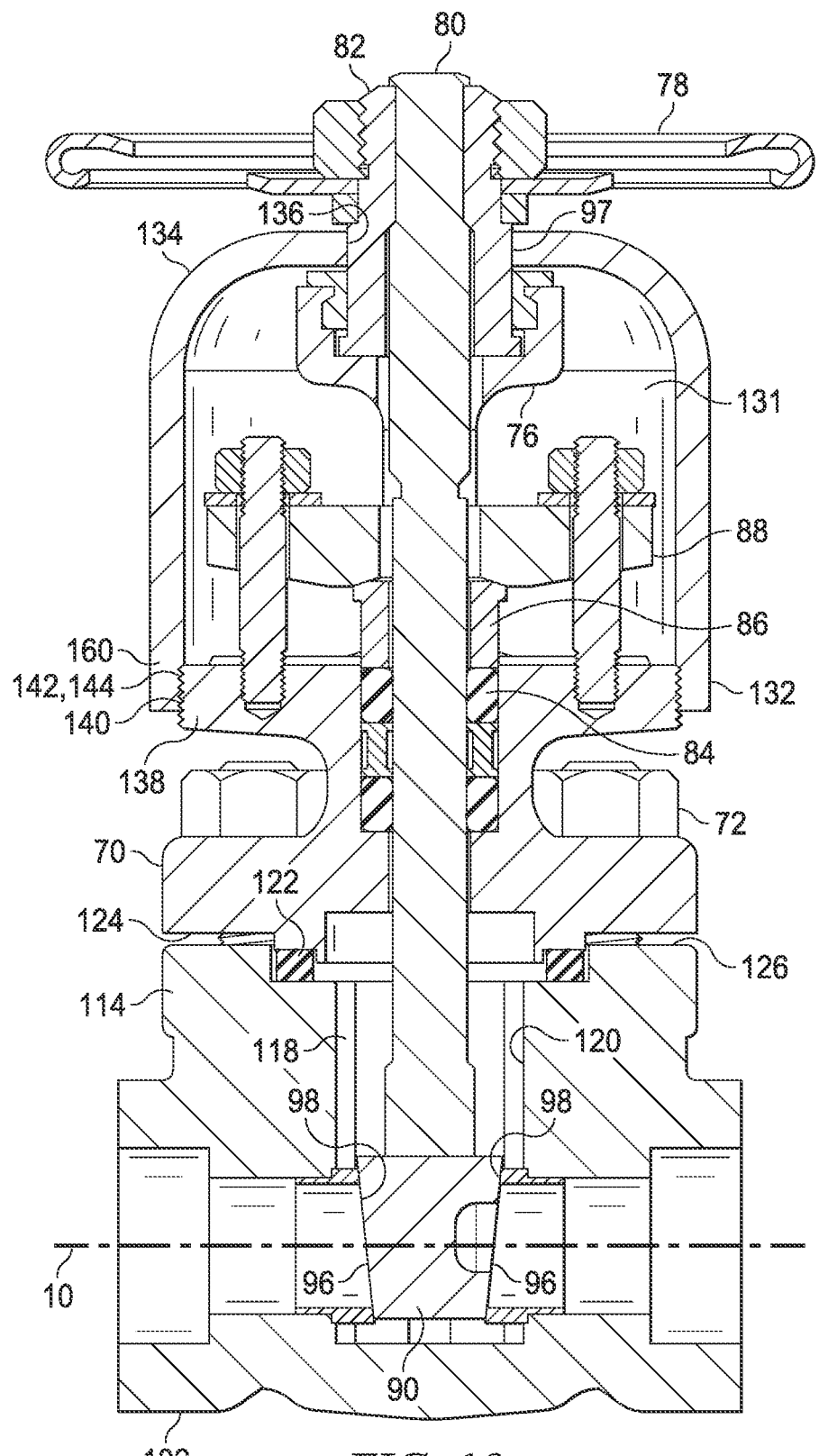
FIG. 10 is a cross-sectional view of the valve assembly shown in FIG. 9.
Figure 11A:
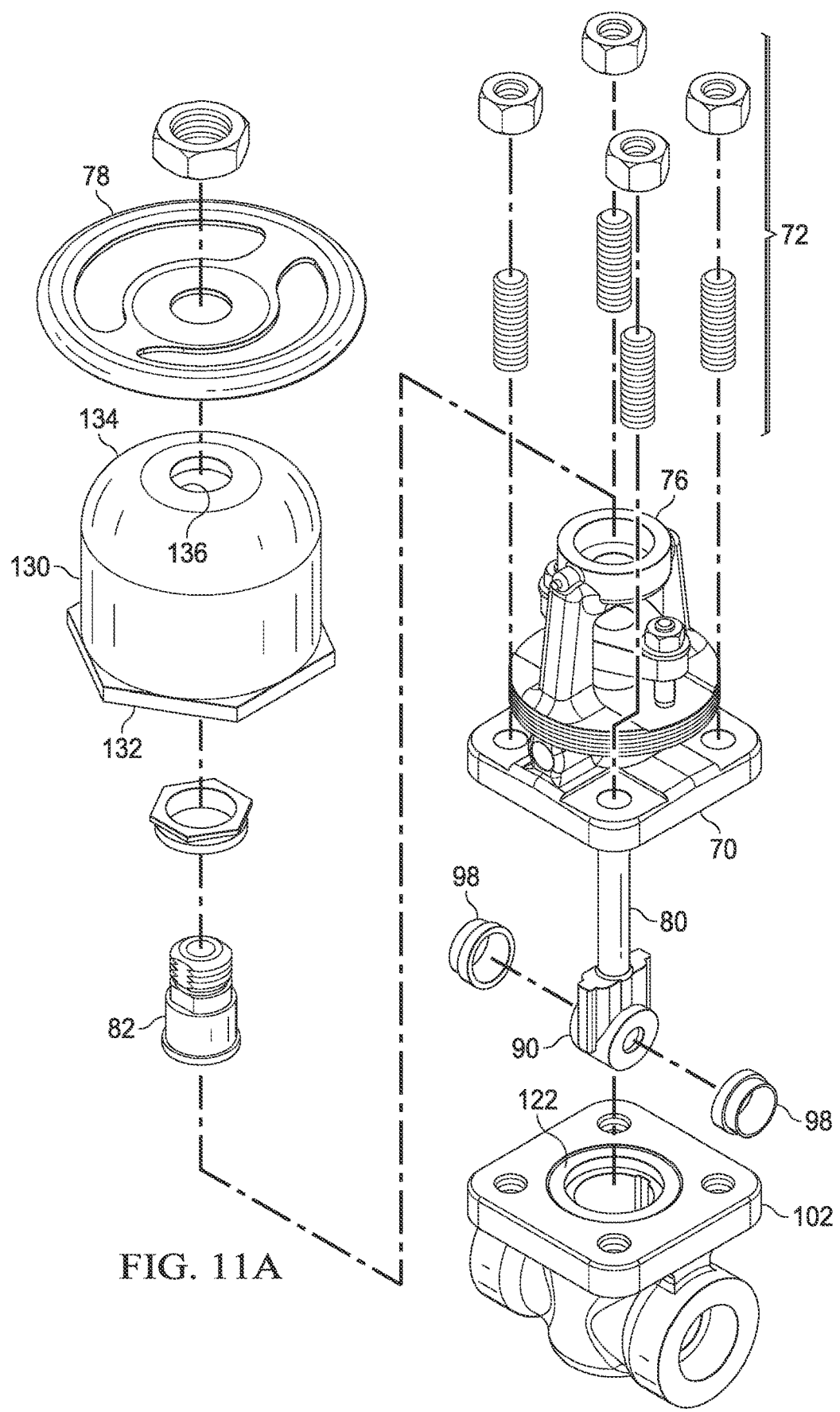
FIGS. 11A-11C illustrate, from multiple perspectives, an exploded view of the valve assembly shown in FIG. 9.
Figure 11B:
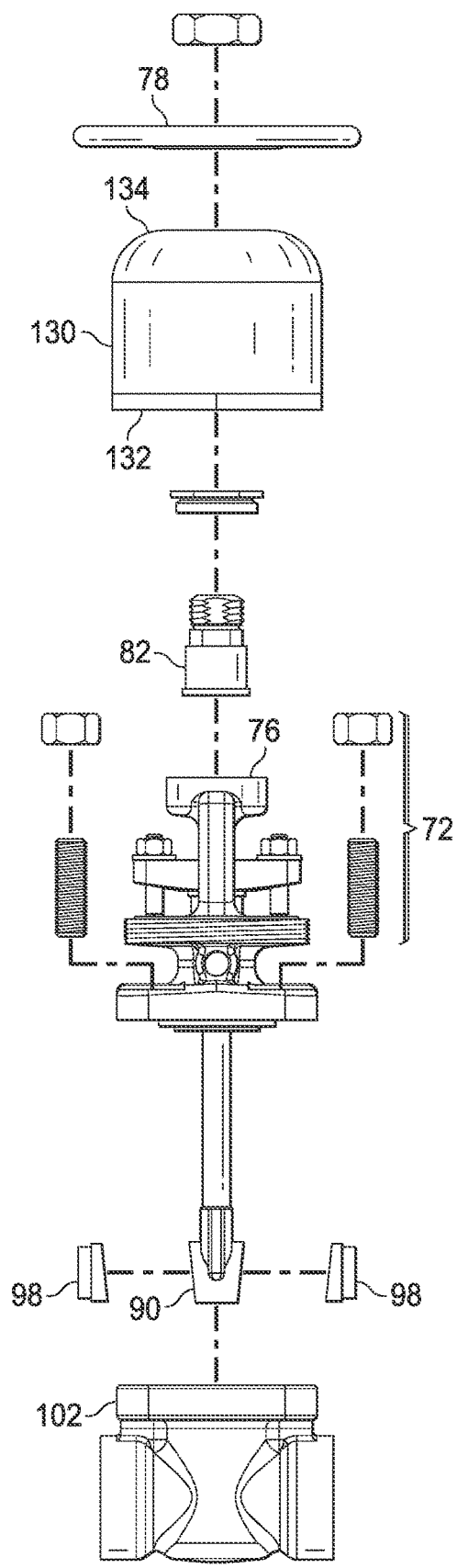
Figure 11C:
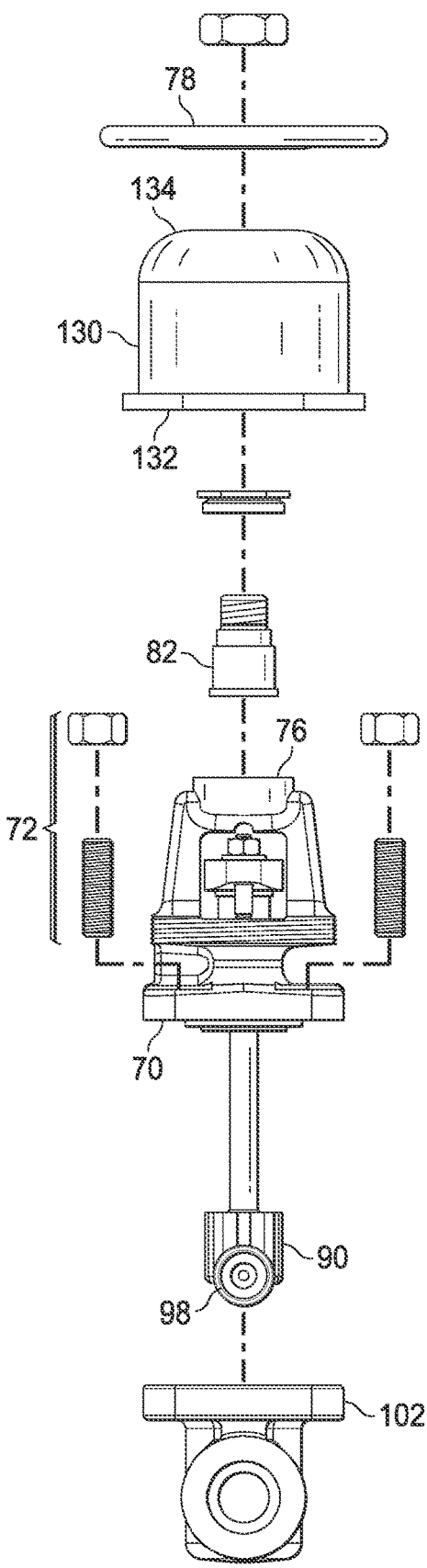

In certain embodiments, such as shown with reference to FIGS. 9-11, the cap 130 is threadably engaged with an outer periphery 140 of the annular flange 138, for example by way of interior threads 142 formed along a bottom circumferential flange 160 of the cap, or inner circumferential surface thereof, interfacing with threads 144 formed on the outer periphery 140 of the annular flange 138, with the threads 142, 144 configured as national pipe tapered (NPT) threads in one embodiment.

In various embodiments, such as shown in FIG. 1, the bonnet includes an upstanding peripheral flange 146, with the an inner periphery thereof being threaded and sealing coupled with the cap having exterior threads 148 formed along a bottom circumference of the cap, or bottom circumferential flange, interfacing with interior threads 150 on the flange 146, with the threads 148, 150 configured as NPT threads in one embodiment.

As shown in the non-limiting example of FIG. 1, a seal 152, configured for example as a gasket or an O-ring, may be disposed between a bottom surface of the bottom circumferential flange 160 and an upper surface of the annular flange 138 of the bonnet. The yoke 76 is coupled to the bonnet 70, and includes an actuator 78, which is threadably engaged with the stem, for example with a stem nut. The actuator may be rotated, with the valve stem 80 being moveable in response to a rotation of the actuator 78. In this way, the cap 130 encapsulates the top of the bonnet and seals any leakage that may occur through the packing 84.

Figure 6:
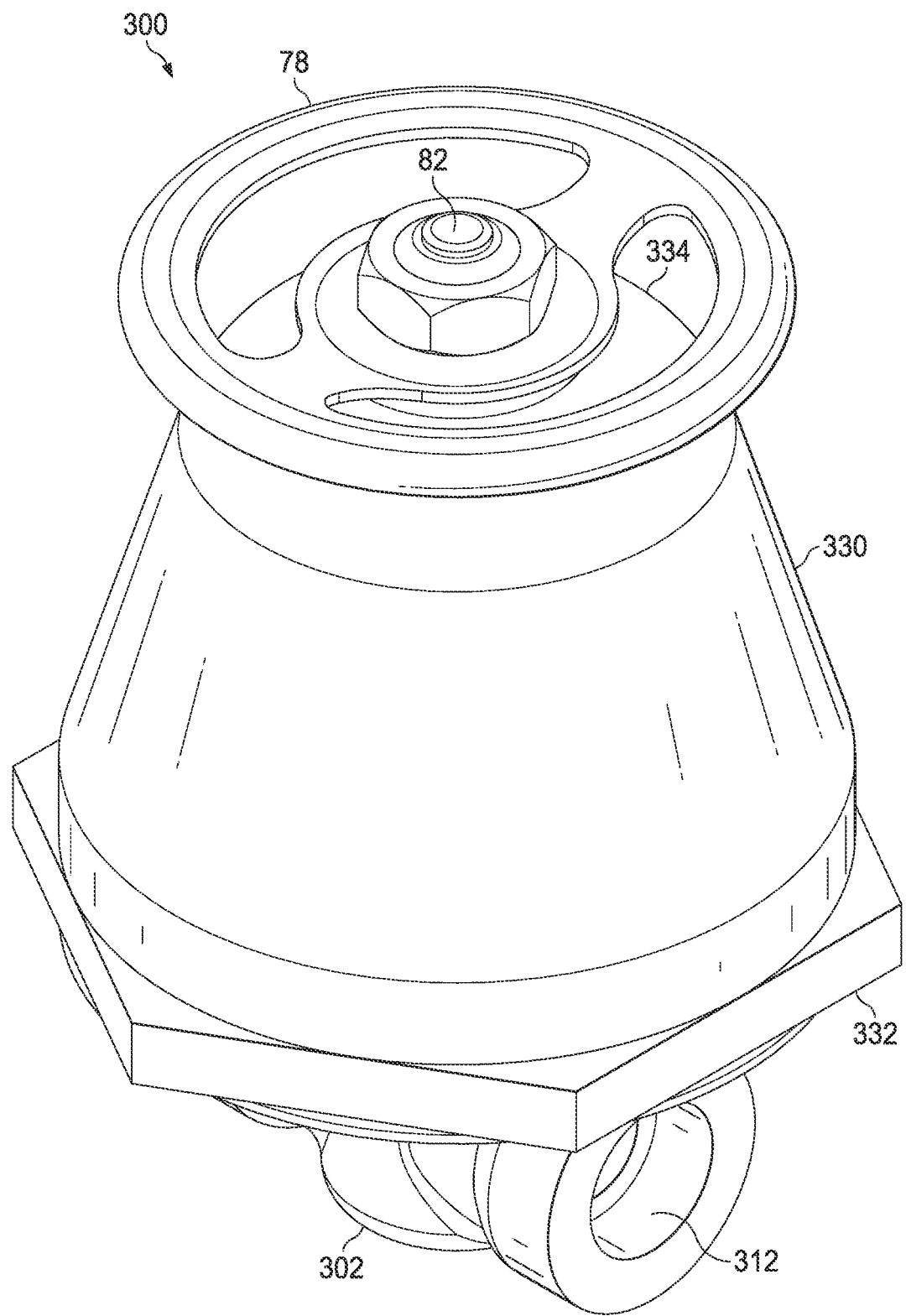
FIG. 6 illustrates, in perspective view, an example of a valve assembly according to various embodiments of this disclosure.
Figure 7:
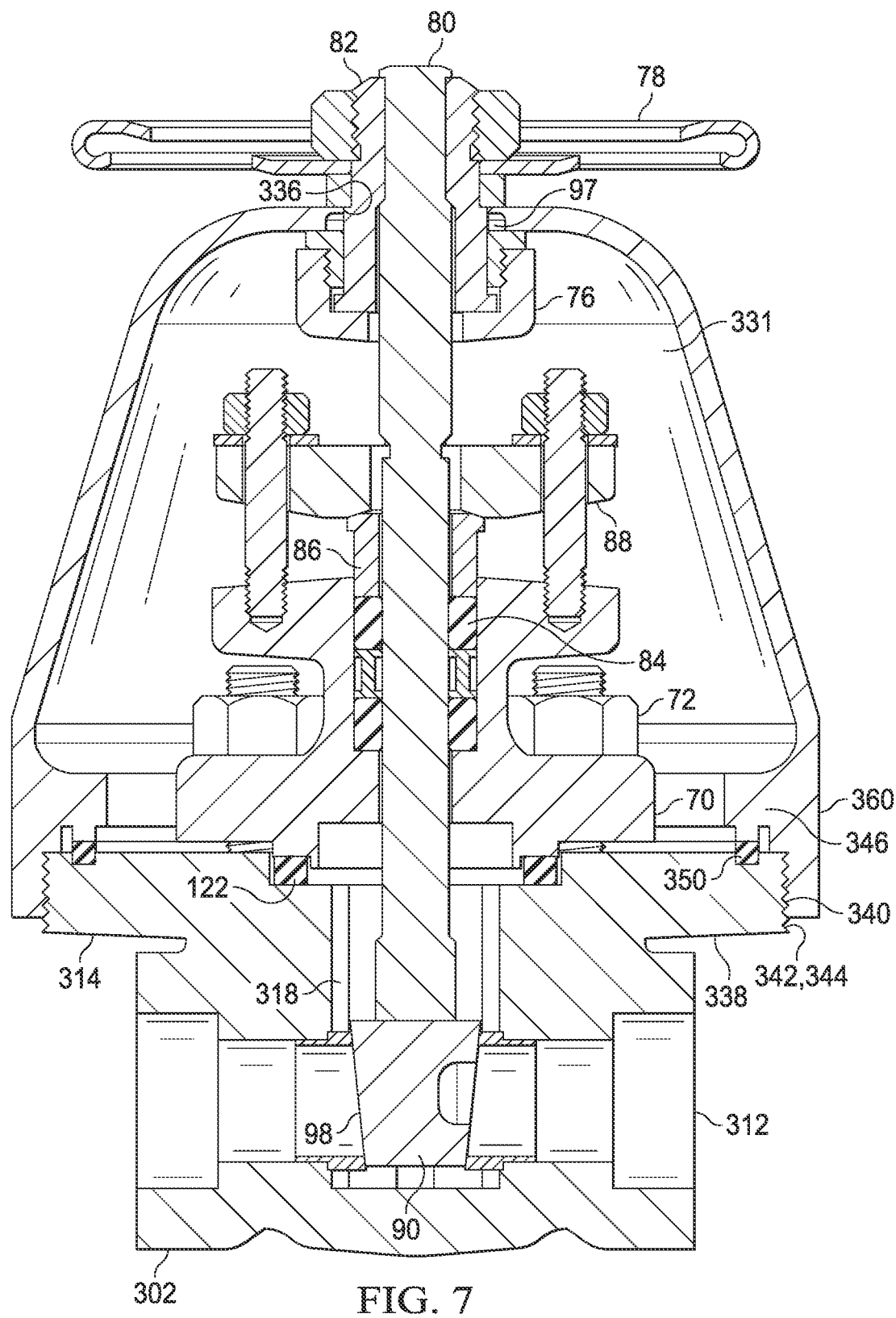
FIG. 7 is a cross-sectional view of the valve assembly shown in FIG. 6.
Figure 8A:
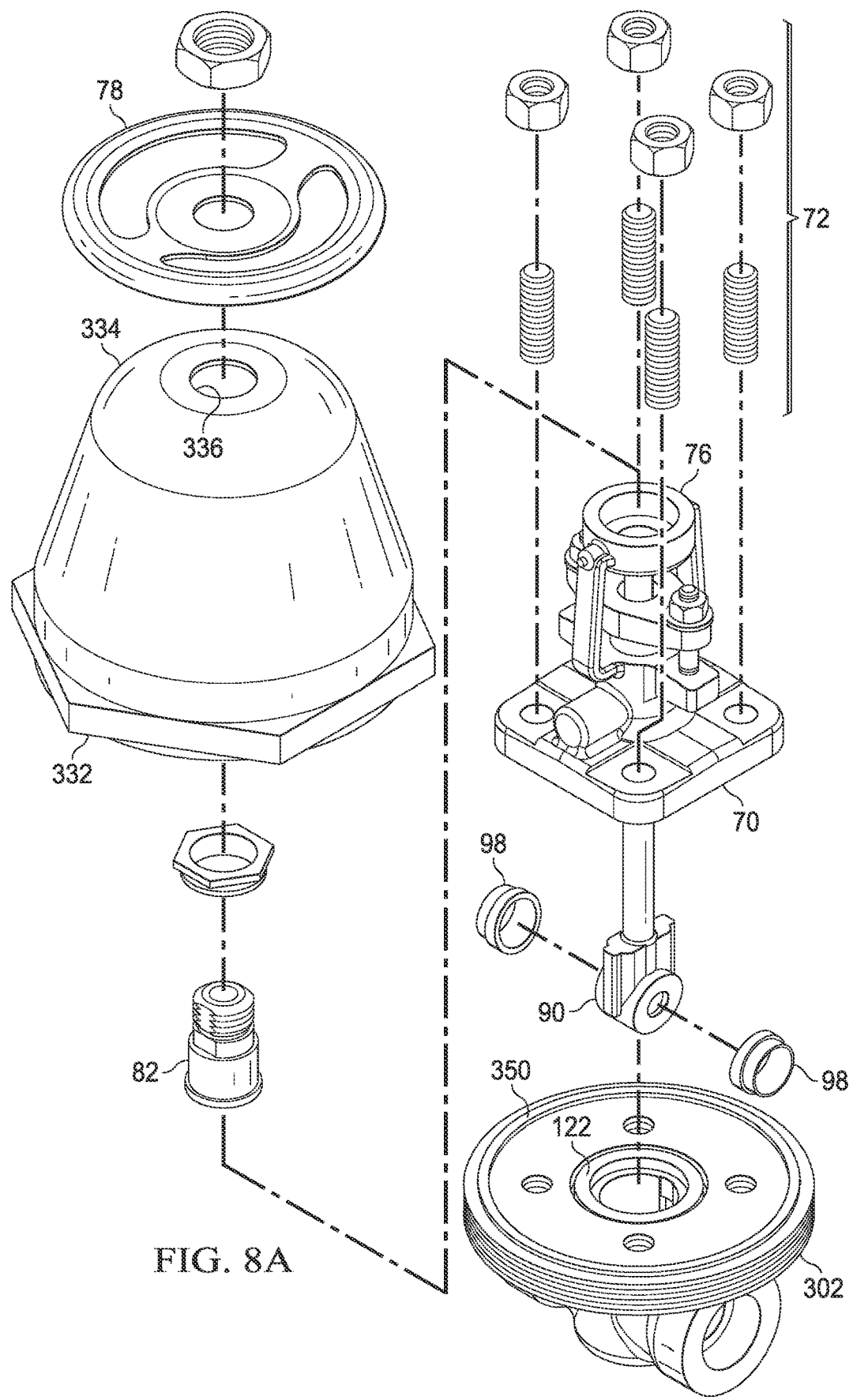
FIGS. 8A-8C illustrate, from multiple perspectives, an exploded view of the valve assembly shown in FIG. 6.
Figure 8B:
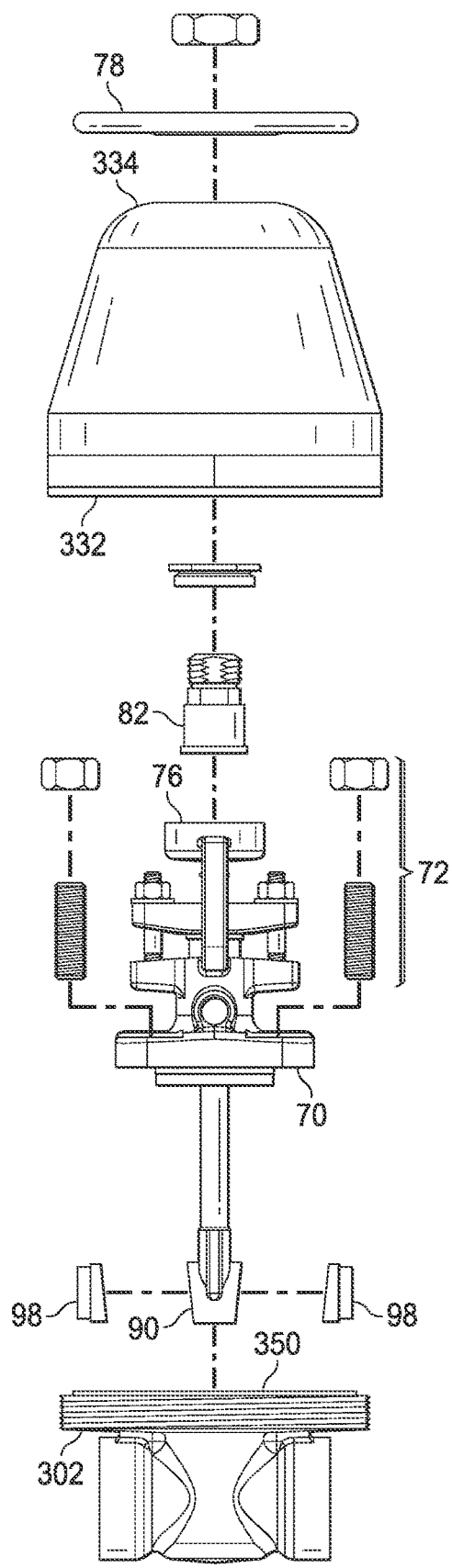
Figure 8C:
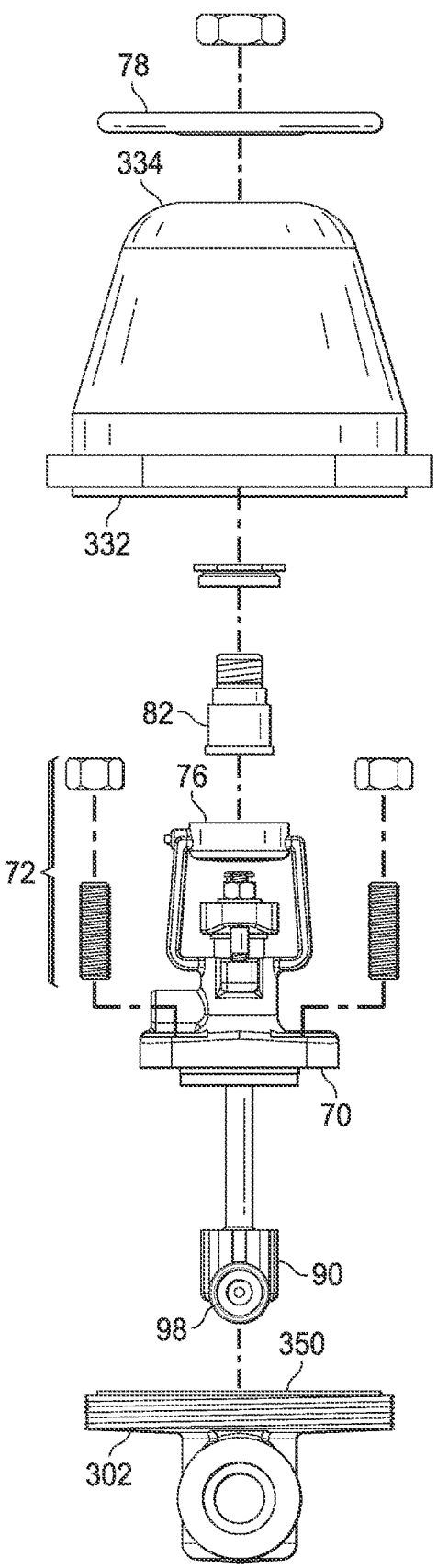

Referring to the illustrative examples of FIGS. 6-8, a valve assembly includes a bonnet 70 coupled to the top surface of the body and a stem 80 supported by the bonnet and operably coupled to the valve 90. A cap 330 includes a bottom 332 sealingly coupled to the body and a top 334 with an opening 336, wherein the cap is disposed over the bonnet 70 with the stem 80 extending through the opening. In one embodiment, the body includes an annular flange 338 defining the top surface, with the bottom of the cap being coupled to the annular flange. In one embodiment, the bottom of the cap includes a circumferential flange 360 that is threadably engaged by way of interfacing threads 342, 344, for example with NPT threads, with a circumferential periphery 340 of the annular flange as shown in FIG. 7. The cap includes an annular flange 346 extending radially inwardly from the bottom circumferential flange 360. A seal 350 is disposed between the annular flange of the cap and the annular flange of the body. In various embodiments, the annular flange may extend radially outwardly from the circumferential flange, overlie and be coupled to the annular flange of the body, for example with bolts. The cap defines an interior chamber 338 in which the yoke is disposed, and which communicates with the interface between the stem and bonnet packing 84 or gland 86.

In one embodiment, a method of retrofitting a valve assembly includes providing a body 102, 302 having spaced apart ports defining a flow passageway therebetween and a top surface, a valve disposed in the flow passageway, a bonnet 70 coupled to the top surface of the body, a stem 80 supported by the bonnet, for example with a yoke 76, and operably coupled to the valve, and an actuator 78 coupled to the stem, e.g., with a stem nut, and supported by the yoke. In operation, the actuator 78 can be removed, separated, or disengaged from the stem 80. A cap is then disposed over the yoke 76 and bonnet 70 and sealingly engaged with the yoke, for example with a mechanical seal 97. During this operation, the stem 80 (and stem nut) is inserted through the opening 136, 336 in the top of the cap. The bottom of the cap 134, 334 is sealingly engaged with at least one of the body or the bonnet with a bottom of the cap, and may be coupled thereto by way of interfacing threads. The actuator 78 is reinstalled on the stem on the outside (e.g., above the outer surface) of the cap 134, 334.

In certain embodiments, such as shown with reference to FIGS. 1 and 6-11, the bonnet is encapsulated by the cap 130, 330, or disposed in the interior chamber or cavity 131, 331 thereof, such that any leakage through the packing 84 or gland 86 is contained within the interior chamber 131, 331 of the cap 130, 330, with the cap being sealed either to the bonnet or the valve body, and also around the stem, which may include a stem nut.

Examples of valve assemblies according to the present disclosure include valve assemblies comprising a body comprising spaced apart ports defining a flow passageway therebetween and a top surface, a valve disposed in the flow passageway, a bonnet coupled to the top surface of the body, a stem supported by the bonnet and operably coupled to the valve, and a cap comprising a bottom sealingly coupled to at least one of the body or the bonnet and a top with an opening. Examples of valve assemblies according to embodiments of this disclosure include valve assemblies where the cap is disposed over the bonnet with the stem extending through the opening.

Examples of valve assemblies according to the present disclosure include valve assemblies wherein the body comprises an annular flange defining the top surface, and wherein the bottom of the cap is coupled to the annular flange.

Examples of valve assemblies according to the present disclosure include valve assemblies wherein the cap is threadably engaged with a circumferential periphery of the annular flange.

Examples of valve assemblies according to the present disclosure include valve assemblies wherein the bottom of the cap comprises a bottom circumferential flange threadably engaged with the circumferential periphery.

Examples of valve assemblies according to the present disclosure include valve assemblies wherein the cap further comprises an annular flange extending radially inwardly from the bottom circumferential flange, and further comprising a seal disposed between the annular flange of the cap and the annular flange of the body.

Examples of valve assemblies according to the present disclosure include valve assemblies wherein the cap further comprises an annular flange extending radially from the bottom of the cap, the annular flange overlying and coupled to the annular flange of the body.

Examples of valve assemblies according to the present disclosure include valve assemblies further comprising a seal disposed between the annular flange of the cap and the annular flange of the body.

Examples of valve assemblies according to the present disclosure include valve assemblies wherein the bonnet comprises an annular flange, wherein the bottom of the cap is coupled to the annular flange.

Examples of valve assemblies according to the present disclosure include valve assemblies wherein the cap is threadably engaged with the annular flange.

Examples of valve assemblies according to the present disclosure include valve assemblies wherein the cap comprises a bottom circumferential flange threadably engaged with a circumferential periphery of the annular flange.

Examples of valve assemblies according to the present disclosure include valve assemblies further comprising a seal disposed between a bottom surface of a bottom circumferential flange of the cap and an upper surface of the annular flange of the bonnet.

Examples of valve assemblies according to the present disclosure include valve assemblies further comprising a yoke coupled to the bonnet and supporting an actuator, wherein the stem is threadably engaged with the actuator, and wherein the stem is moveable in response to a rotation of the stem.

Examples of valve assemblies according to the present disclosure include valve assemblies further comprising a packing seal disposed between the bonnet and the stem.

Examples of valve assemblies according to the present disclosure include valve assemblies comprising a body comprising spaced apart ports defining a flow passageway therebetween, and a top surface, a valve disposed in the flow passageway, a bonnet coupled to the top surface of the body, a stem supported by the bonnet and operably coupled to the valve, and a cap comprising a bottom threadably coupled to the bonnet and a top with an opening, wherein the cap is disposed around the bonnet with the stem extending through the opening.

Examples of valve assemblies according to the present disclosure include valve assemblies wherein the bonnet comprises an annular flange, wherein the bottom of the cap is coupled to the annular flange.

Examples of valve assemblies according to the present disclosure include valve assemblies wherein the cap is threadably engaged with the annular flange.

Examples of valve assemblies according to the present disclosure include valve assemblies further comprising national pipe tapered (NPT) threads interfacing between the cap and the annular flange.

Examples of valve assemblies according to the present disclosure include valve assemblies wherein the cap comprises a bottom circumferential flange threadably engaged with a circumferential periphery of the annular flange.

Examples of valve assemblies according to the present disclosure include valve assemblies further comprising a seal disposed between a bottom surface of a bottom circumferential flange of the cap and an upper surface of an annular flange of a yoke.

Examples of valve assemblies according to the present disclosure include valve assemblies comprising a body comprising spaced apart ports defining a flow passageway therebetween and a top surface, a bonnet coupled to the top surface of the body, a valve disposed in the flow passageway, a stem supported by the bonnet and operably coupled to the valve, and a cap comprising a bottom sealingly coupled to the body and a top with an opening, wherein the cap is disposed over the bonnet and wherein the stem extends through the opening.

Examples of valve assemblies according to the present disclosure include valve assemblies wherein the body comprises an annular flange defining the top surface, and wherein the bottom of the cap is coupled to the annular flange.

Examples of valve assemblies according to the present disclosure include valve assemblies wherein the cap is threadably engaged with a circumferential periphery of the annular flange.

Examples of valve assemblies according to the present disclosure include valve assemblies further comprising national pipe tapered (NPT) threads interfacing between the cap and the annular flange.

Examples of valve assemblies according to the present disclosure include valve assemblies wherein the cap comprises a bottom circumferential flange threadably engaged with the circumferential periphery.

Examples of valve assemblies according to the present disclosure include valve assemblies wherein the cap further comprises an annular flange extending radially inwardly from the bottom circumferential flange, and further comprising a seal disposed between the annular flange of the cap and the annular flange of the body.

Examples of valve assemblies according to the present disclosure include valve assemblies wherein the cap further comprises an annular extending radially from the bottom of the cap, the annular flange overlying and coupled to the annular flange of the body.

Examples of valve assemblies according to the present disclosure include valve assemblies further comprising a seal disposed between the annular flange of the cap and the annular flange of the body.

Examples of methods for retrofitting a valve assembly according to some embodiments of this disclosure include the steps of providing a body comprising spaced apart ports defining a flow passageway therebetween and a top surface, a valve disposed in the flow passageway, a bonnet coupled to the top surface of the body, a stem supported by the bonnet and operably coupled to the valve, and an actuator coupled to the stem, removing the actuator from the stem, disposing a cap over the bonnet, inserting the stem through an opening in at a top of the cap, sealing engaging at least one of the body or the bonnet with a bottom of the cap, and reinstalling the actuator on the stem on the outside of the cap.

Examples of methods for retrofitting a valve assembly according to some embodiments of this disclosure include embodiments wherein the body comprises an annular flange defining the top surface, and wherein sealing engaging the at least one of the body or the bonnet with the bottom of the cap comprises coupling the bottom of the cap to the annular flange.

Examples of methods for retrofitting a valve assembly according to some embodiments of this disclosure include embodiments wherein coupling the bottom of the cap to the annular flange comprises threadably engaging a circumferential periphery of the annular flange with the bottom of the cap.

Examples of methods for retrofitting a valve assembly according to some embodiments of this disclosure include embodiments wherein threadably engaging the circumferential periphery of the annular flange with the bottom of the cap comprises threadably engaging the circumferential periphery of the annular flange with a bottom circumferential flange of the cap.

Examples of methods for retrofitting a valve assembly according to some embodiments of this disclosure include embodiments further comprising forming a seal between an annular flange extending radially inwardly from the cap and the annular flange of the body.

Examples of methods for retrofitting a valve assembly according to some embodiments of this disclosure include embodiments wherein sealingly engaging the at least one of the body or the bonnet with the bottom of the cap further comprises coupling an annular flange extending radially from the cap and the annular flange of the body.

Examples of methods for retrofitting a valve assembly according to some embodiments of this disclosure include embodiments comprising forming a seal between the annular flange of the cap and the annular flange of the body.

Examples of methods for retrofitting a valve assembly according to some embodiments of this disclosure include embodiments wherein sealingly engaging the at least one of the body or the bonnet with the bottom of the cap comprises coupling the bottom of the cap to an annular flange of the bonnet.

Examples of methods for retrofitting a valve assembly according to some embodiments of this disclosure include embodiments wherein coupling the bottom of the cap to the annular flange of the bonnet comprises threadably engaging the annular flange of the bonnet with the cap.

Examples of methods for retrofitting a valve assembly according to some embodiments of this disclosure include embodiments wherein threadably engaging the annular flange of the bonnet with the cap comprises threadably engaging a circumferential periphery of the annular flange with a bottom circumferential flange of the cap.

Examples of methods for retrofitting a valve assembly according to some embodiments of this disclosure include embodiments comprising disposing a seal between a bottom surface of the bottom circumferential flange and an upper surface of the annular flange of the bonnet.

Examples of valve assemblies according to various embodiments of this disclosure include valve assemblies comprising a body comprising spaced apart ports defining a flow passageway therebetween and a top surface, a valve disposed in the flow passageway and movable in a transverse direction between and open and closed positions relative to the flow passageway, a cap sealingly coupled to the body and having an opening, a stem rotatably supported by the cap and threadably coupled to the valve, wherein the stem is rotatable in first and second rotation directions, and wherein the valve is moveable in the transverse direction between the closed and open positions as the stem is rotated in the first rotation direction, and wherein the valve is moveable in the transverse direction between the open and closed positions as the stem is rotated in the second rotation direction, and a mechanical seal disposed between the stem and the cap.

Examples of valve assemblies according to various embodiments of this disclosure include valve assemblies wherein the valve comprises an internal thread and the stem comprises an external thread threadably engaged with the internal thread of the valve.

Examples of valve assemblies according to various embodiments of this disclosure include valve assemblies wherein one of the valve and the body comprises a guide and the other of the body and valve comprises a track, wherein the guide is movable in the track as the valve is moved between the closed and open positions.

Examples of valve assemblies according to various embodiments of this disclosure include valve assemblies comprising a stem nut coupled to the stem, and wherein the mechanical seal is disposed between the stem nut and the cap.

Examples of valve assemblies according to various embodiments of this disclosure include valve assemblies comprising an actuator fixedly secured to the stem nut.

Examples of methods according to certain embodiments of this disclosure include methods wherein one of the valve and the body comprises a guide and the other of the body and valve comprises a track, and wherein moving the valve from the closed to the open position comprises moving the guide in the track.

Examples of methods according to certain embodiments of this disclosure include methods wherein the actuator is coupled to the stem with a stem nut coupled to the stem, and wherein the mechanical seal is disposed between the stem nut and the cap.

Examples of methods according to certain embodiments of this disclosure include methods wherein the actuator is fixedly secured to the stem nut.

Examples of methods according to certain embodiments of this disclosure include methods wherein the actuator comprises a hand wheel.

Although the present disclosure has been described with reference to the embodiments shown in FIGS. 1-11C, those skilled in the art will recognize that changes may be made in form and detail without departing from the spirit and scope of the disclosure. As such, it is intended that the foregoing detailed description be regarded as illustrative rather than limiting.

Although the present disclosure has been described with various embodiments, various changes and modifications may be suggested to one skilled in the art. It is intended that the present disclosure encompass such changes and modifications as falling within the scope of the claims.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

What is claimed is:

1. A valve assembly comprising:
   a body comprising spaced apart ports defining a flow passageway therebetween and a top surface;
   a valve disposed in the flow passageway;
   a bonnet secured to the top surface of the body by a plurality of bolts;
   a stem supported by a yoke that is coupled to the bonnet, the stem operably coupled to the valve; and
   a cap comprising:
      a bottom sealingly and threadably coupled to one of;
         a circumferential periphery of an annular flange of the body; or
         the bonnet; and
      a top with an opening,
   wherein the cap is disposed over the bonnet with the stem extending through the opening, and
   wherein the bonnet or the cap cover an upper surface of the plurality of bolts.

2. The valve assembly of claim 1, wherein the annular flange defines the top surface, and wherein the bottom of the cap is sealingly and threadably coupled to the circumferential periphery of the annular flange of the body.

3. The valve assembly of claim 2, wherein the bottom of the cap comprises a bottom circumferential flange threadably engaged with the circumferential periphery.

4. The valve assembly of claim 3, wherein the cap further comprises an annular flange extending radially inwardly from the bottom circumferential flange, and further comprising a seal disposed between the annular flange of the cap and the annular flange of the body.

5. The valve assembly of claim 2, wherein the cap further comprises an annular flange extending radially from the bottom of the cap, the annular flange overlying and coupled to the annular flange of the body.

6. The valve assembly of claim 5, further comprising a seal disposed between the annular flange of the cap and the annular flange of the body.

7. The valve assembly of claim 1, wherein the bonnet comprises an annular flange, wherein the bottom of the cap is coupled to the annular flange of the bonnet.

8. The valve assembly of claim 7, wherein the cap is threadably engaged with the annular flange of the bonnet.

9. The valve assembly of claim 8, wherein the cap comprises a bottom circumferential flange threadably engaged with a circumferential periphery of the annular flange of the bonnet.

10. The valve assembly of claim 8, further comprising a seal disposed between a bottom surface of a bottom circumferential flange of the cap and an upper surface of the annular flange of the bonnet.

11. The valve assembly of claim 1, wherein:
the yoke is coupled to the bonnet and supporting an actuator,
the stem is threadably engaged with the actuator, and
the stem is moveable in response to a rotation of the stem.

12. The valve assembly of claim 11, further comprising a packing seal disposed between the bonnet and the stem.

13. The valve assembly of claim 1, wherein an enclosed cavity is formed within an internal surface of the cap and a surface of the body or the bonnet when the cap is coupled to at least one of the body or the bonnet, the enclosed cavity contains leaked fluid.

14. A valve assembly comprising:
a body comprising spaced apart ports defining a flow passageway therebetween, and a top surface;
a valve disposed in the flow passageway;
a bonnet secured to the top surface of the body by a plurality of bolts;
a stem supported by a yoke that is coupled to the bonnet, the stem operably coupled to the valve; and
a cap comprising a bottom threadably coupled to the bonnet and a top with an opening,
wherein the cap is disposed around the bonnet with the stem extending through the opening, and
wherein the bonnet or the cap cover an upper surface of the plurality of bolts.

15. The valve assembly of claim 14, wherein the bonnet comprises an annular flange, wherein the bottom of the cap is coupled to the annular flange.

16. The valve assembly of claim 15, wherein the cap is threadably engaged with the annular flange.

17. The valve assembly of claim 16, further comprising national pipe tapered (NPT) threads interfacing between the cap and the annular flange.

18. The valve assembly of claim 17, wherein the cap comprises a bottom circumferential flange threadably engaged with a circumferential periphery of the annular flange.

19. The valve assembly of claim 16, further comprising a seal disposed between a bottom surface of a bottom circumferential flange of the cap and an upper surface of an annular flange of the yoke.

\* \* \* \* \*